(12) United States Patent
Seo et al.

(10) Patent No.: US 8,041,179 B2
(45) Date of Patent: Oct. 18, 2011

(54) METHODS AND APPARATUSES FOR REPRODUCING AND RECORDING STILL PICTURE AND AUDIO DATA AND RECORDING MEDIUM HAVING DATA STRUCTURE FOR MANAGING REPRODUCTION OF STILL PICTURE AND AUDIO DATA

(75) Inventors: Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1042 days.

(21) Appl. No.: 10/782,867

(22) Filed: Feb. 23, 2004

(65) Prior Publication Data
US 2004/0165867 A1 Aug. 26, 2004

(30) Foreign Application Priority Data
Feb. 24, 2003 (KR) .......................... 10-2003-011521

(51) Int. Cl.
*H04N 5/765* (2006.01)
*H04N 5/932* (2006.01)
(52) U.S. Cl. ........................................ 386/200; 386/201
(58) Field of Classification Search .................. 386/46, 386/111
See application file for complete search history.

(56) References Cited

U.S. PATENT DOCUMENTS

| | | | |
|---|---|---|---|
| 5,854,873 A | 12/1998 | Mori et al. | |
| 5,870,523 A | 2/1999 | Kikuchi et al. | |
| 5,884,004 A | 3/1999 | Sato et al. | |
| 5,999,698 A | 12/1999 | Nakai et al. | |
| 6,122,436 A * | 9/2000 | Okada et al. | 386/126 |
| 6,157,769 A | 12/2000 | Yoshimura et al. | |
| 6,266,483 B1 | 7/2001 | Okada et al. | |
| 6,285,826 B1 | 9/2001 | Murase et al. | |
| 6,308,005 B1 | 10/2001 | Ando et al. | |
| 6,341,196 B1 | 1/2002 | Ando et al. | |
| 6,353,702 B1 | 3/2002 | Ando et al. | |
| 6,374,037 B1 | 4/2002 | Okada et al. | |
| 6,385,389 B1 | 5/2002 | Maruyama et al. | |
| 6,393,430 B1 | 5/2002 | Van Ryzin | |
| 6,400,893 B1 | 6/2002 | Murase et al. | |
| 6,424,797 B1 * | 7/2002 | Murase et al. | 386/125 |
| 6,442,337 B1 | 8/2002 | Okada et al. | |
| 6,470,460 B1 | 10/2002 | Kashiwagi et al. | |
| 6,493,504 B1 | 12/2002 | Date et al. | |
| 6,532,335 B2 | 3/2003 | Otomo et al. | |

(Continued)

FOREIGN PATENT DOCUMENTS
AU 6672298 9/1998
(Continued)

OTHER PUBLICATIONS

European Telecommunications Standards Institute, "*Digital Video Broadcasting (DVB); Subtitling systems*", 1997, pp. 1-45.

(Continued)

*Primary Examiner* — Peter-Anthony Pappas
*Assistant Examiner* — Oluwaseun A Adegeye
(74) *Attorney, Agent, or Firm* — Harness, Dickey & Pierce, P.L.C.

(57) ABSTRACT

In the method of reproducing still picture data and audio data from a recording medium, the still picture data and the audio data reproduced from the recording medium are decoded based on respective, independent system times (STCs).

16 Claims, 8 Drawing Sheets

U.S. PATENT DOCUMENTS

| | | | |
|---|---|---|---|
| 6,574,419 B1 * | 6/2003 | Nonomura et al. | 386/95 |
| 6,580,870 B1 | 6/2003 | Kanazawa et al. | |
| 6,594,442 B1 | 7/2003 | Kageyama et al. | |
| 6,798,976 B2 | 9/2004 | Tsumagari et al. | |
| 6,823,010 B1 | 11/2004 | Curet et al. | |
| 6,829,211 B2 | 12/2004 | Sako et al. | |
| 6,856,756 B1 | 2/2005 | Mochizuki et al. | |
| 6,943,684 B2 | 9/2005 | Berry | |
| 6,975,363 B1 * | 12/2005 | Baldwin et al. | 348/512 |
| 6,999,674 B1 | 2/2006 | Hamada et al. | |
| 7,054,545 B2 | 5/2006 | Ando et al. | |
| 7,194,194 B2 | 3/2007 | Kashiwagi et al. | |
| 7,224,890 B2 | 5/2007 | Kato | |
| 2001/0000809 A1 | 5/2001 | Ando et al. | |
| 2001/0016112 A1 | 8/2001 | Heo et al. | |
| 2001/0043790 A1 | 11/2001 | Saeki et al. | |
| 2001/0046371 A1 | 11/2001 | Ando et al. | |
| 2002/0035575 A1 | 3/2002 | Taira et al. | |
| 2002/0085022 A1 | 7/2002 | Masuda et al. | |
| 2002/0110369 A1 * | 8/2002 | Mori et al. | 386/98 |
| 2002/0127001 A1 | 9/2002 | Gunji et al. | |
| 2002/0135607 A1 | 9/2002 | Kato et al. | |
| 2002/0135608 A1 | 9/2002 | Hamada et al. | |
| 2002/0145702 A1 | 10/2002 | Kato et al. | |
| 2002/0164152 A1 * | 11/2002 | Kato et al. | 386/95 |
| 2002/0172496 A1 | 11/2002 | Gunji et al. | |
| 2003/0014760 A1 | 1/2003 | Yamauchi et al. | |
| 2003/0138238 A1 * | 7/2003 | Kashiwagi et al. | 386/95 |
| 2003/0235406 A1 | 12/2003 | Seo et al. | |
| 2004/0057700 A1 | 3/2004 | Okada et al. | |
| 2004/0141436 A1 | 7/2004 | Monahan | |
| 2004/0184780 A1 | 9/2004 | Seo et al. | |
| 2004/0213552 A1 | 10/2004 | Kato | |
| 2005/0105888 A1 | 5/2005 | Hamada et al. | |
| 2005/0163463 A1 | 7/2005 | Schick et al. | |
| 2005/0196143 A1 | 9/2005 | Kato et al. | |
| 2005/0201718 A1 | 9/2005 | Kato | |
| 2005/0254363 A1 | 11/2005 | Hamada et al. | |
| 2006/0195633 A1 | 8/2006 | Plourde, Jr. | |

FOREIGN PATENT DOCUMENTS

| | | |
|---|---|---|
| AU | 2003282415 | 11/2003 |
| CN | 1205503 | 1/1999 |
| CN | 1240293 | 1/2000 |
| CN | 1244710 A | 2/2000 |
| CN | 1263672 | 8/2000 |
| CN | 1063863 | 3/2001 |
| CN | 1303094 | 7/2001 |
| CN | 1304533 | 7/2001 |
| CN | 1381137 | 11/2002 |
| DE | 69907758 | 2/2004 |
| DE | 60002774 | 3/2004 |
| EP | 0856849 | 8/1998 |
| EP | 0949825 B1 | 10/1999 |
| EP | 0978994 | 2/2000 |
| EP | 1045393 | 10/2000 |
| EP | 1113439 | 7/2001 |
| EP | 0942609 | 10/2001 |
| EP | 1 198 133 | 4/2002 |
| EP | 1204269 A1 | 5/2002 |
| EP | 1300851 | 4/2003 |
| EP | 1041566 | 5/2003 |
| FR | 2581771 | 11/1986 |
| GB | 2119151 | 11/1983 |
| JP | 1-300777 | 12/1989 |
| JP | 06-311481 | 11/1994 |
| JP | 7-057436 | 3/1995 |
| JP | 07-262646 | 10/1995 |
| JP | 09-017101 | 1/1997 |
| JP | 10-154373 | 6/1998 |
| JP | 2000-004421 | 1/2000 |
| JP | 2000-020554 | 1/2000 |
| JP | 2000-041212 | 2/2000 |
| JP | 2000-059714 | 2/2000 |
| JP | 2000-268537 | 9/2000 |
| JP | 2000-333126 | 11/2000 |
| JP | 2001-52467 | 2/2001 |
| JP | 2001-069460 | 3/2001 |
| JP | 2001-078123 | 3/2001 |
| JP | 2001-086458 | 3/2001 |
| JP | 2001-103417 | 4/2001 |
| JP | 2001-155466 | 6/2001 |
| JP | 2001-157155 | 6/2001 |
| JP | 2001-167529 | 6/2001 |
| JP | 2001-216739 | 8/2001 |
| JP | 2001-231015 | 8/2001 |
| JP | 2001-285772 | 10/2001 |
| JP | 2002-082684 | 3/2002 |
| JP | 2002-158965 | 5/2002 |
| JP | 2002-208258 | 7/2002 |
| JP | 2002-325221 | 11/2002 |
| JP | 2002-354424 | 12/2002 |
| JP | 2003-016764 | 1/2003 |
| JP | 2003-045154 | 2/2003 |
| JP | 2003-299015 | 10/2003 |
| JP | 2004-336566 | 11/2004 |
| KR | 1998-0086030 | 12/1998 |
| KR | 1999-0070106 | 9/1999 |
| KR | 10-2000-0002840 | 1/2000 |
| KR | 10-2000-0002921 | 1/2000 |
| KR | 10-2000-0002922 | 1/2000 |
| KR | 10-2000-0014419 | 3/2000 |
| KR | 10-2000-0018987 | 4/2000 |
| KR | 10-2001-0013565 | 2/2001 |
| KR | 10-2001-0021485 | 3/2001 |
| KR | 10-2001-0027114 | 4/2001 |
| KR | 10-2001-0051295 | 6/2001 |
| KR | 10-2001-0066211 | 7/2001 |
| KR | 10-2002-0021402 | 3/2002 |
| KR | 10-2002-0064463 | 8/2002 |
| KR | 10-2003-0064546 | 8/2003 |
| TW | 517495 | 1/2003 |
| WO | WO 98/37699 | 8/1998 |
| WO | WO 99/53694 | 10/1999 |
| WO | WO 00/33532 | 6/2000 |
| WO | WO 00/55857 | 9/2000 |
| WO | WO 00/60598 | 10/2000 |
| WO | WO 01/82608 | 11/2001 |
| WO | WO 02/062061 | 8/2002 |
| WO | WO 2004/023234 | 3/2004 |
| WO | WO 2004/023484 | 3/2004 |
| WO | WO 2004/023485 | 3/2004 |
| WO | WO 2004/066281 | 8/2004 |
| WO | WO 2004/075194 | 8/2004 |
| WO | WO 2004/086396 | 10/2004 |

OTHER PUBLICATIONS

Search Report for corresponding European application dated May 16, 2008.
Office Action for corresponding Japanese application dated May 20, 2008.
United States Office Action dated Jul. 9, 2008.
Japanese Office Action dated Jun. 10, 2008.
Japanese Office Action dated Jun. 20, 2008.
Search Report for corresponding European application dated Jul. 30, 2008.
Search Report for corresponding European application dated Sep. 1, 2008.
Japanese Office Action dated Sep. 11, 2008.
"Information technology—Generic coding of moving pictures and associated audio information: Systems", Dec. 1, 2000.
Office Action for corresponding Chinese Application No. 200480003567.9 dated Aug. 8, 2008.
Office Action for corresponding Japanese Application No. 2004-533845 dated Sep. 16, 2008.
International Search Report.
Office Action for corresponding Japanese Application No. 2006-507738 dated Dec. 18, 2009.
Chinese Patent Gazette dated May 12, 2010 for CN Application No. 200480008156.9.

* cited by examiner

FIG. 8

METHODS AND APPARATUSES FOR REPRODUCING AND RECORDING STILL PICTURE AND AUDIO DATA AND RECORDING MEDIUM HAVING DATA STRUCTURE FOR MANAGING REPRODUCTION OF STILL PICTURE AND AUDIO DATA

FOREIGN PRIORITY

The present invention claims priority under 35 U.S.C. 119 on Korean Application No. 10-2003-011521 filed Feb. 24, 2003; the contents of which are incorporated by reference in their entirety.

BACKGROUND OF THE INVENTION

1. Field of the Invention

The present invention relates to methods and apparatuses for reproducing and recording still picture and audio data, and to a recording medium having a data structure for managing reproduction of still picture and audio data.

2. Description of the Related Art

The standardization of new high-density read only and rewritable optical disks capable of recording large amounts of high-quality video and audio data has been progressing rapidly and new optical disk related products are expected to be commercially available in the near future. The Blu-ray Disc Rewritable (BD-RE) and Blu-ray Disk ROM (BD-ROM) are examples of these new optical disks.

While the standard for BD-RE has been published, the standardization for high-density read-only optical disks such as the Blu-ray ROM (BD-ROM) is still under way. Consequently, an effective data structure for managing reproduction of still pictures recorded on the high-density read-only optical disk such as a BD-ROM is not yet available.

SUMMARY OF THE INVENTION

The recording medium according to the present invention includes a data structure for managing reproduction of still pictures and audio data recorded on the recording medium.

In one exemplary embodiment, still picture data and audio data reproduced from the recording medium are decoded based on respective, independent system times (STCs). For example, a first STC for the still picture data is generated based on the still picture data reproduced from the recording medium, and a second STC for the audio data is generated based on the audio data reproduced from the recording medium.

In one exemplary embodiment, the first STC is generated from program clock references (PCRs) in the still picture data, and the second STC is generated from PCRs in the audio data.

In another exemplary embodiment, the still picture data and the audio data are decoded based on the first and second STCs, respectively, and presentation time stamps (PTSs) in the respective still picture and audio data.

The present invention further provides apparatuses and methods for recording and reproducing the data structure according to the present invention, and recording and reproducing slide shows according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings.

Figure 1:
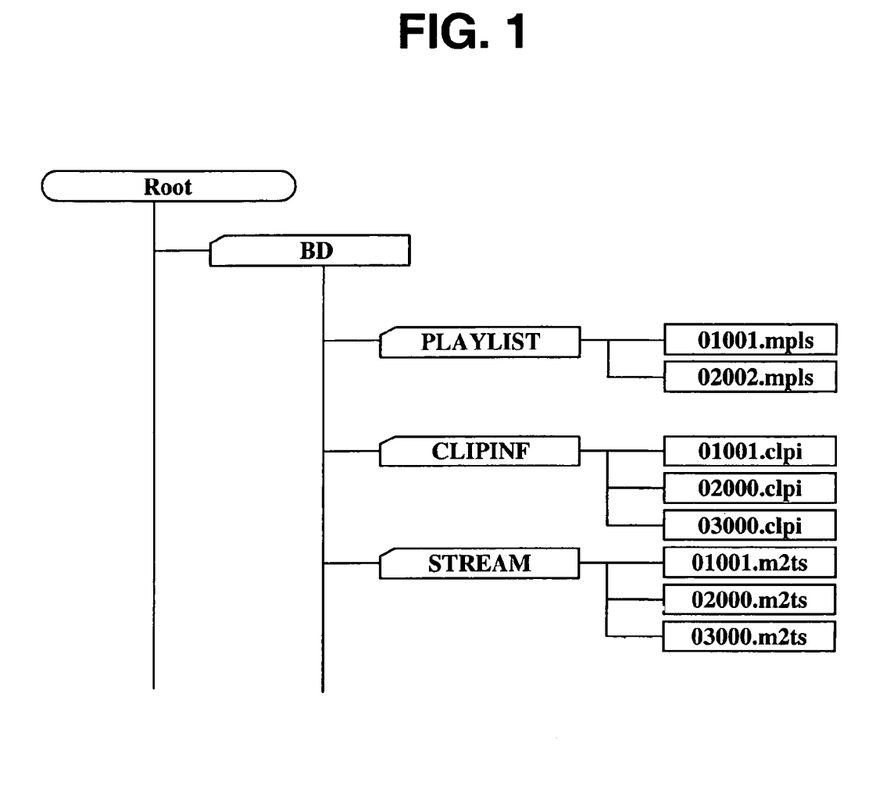
FIG. 1 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will be reviewed, but not described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). The playlist file may also include sub-playitems that also provide a pair of IN-point and OUT-point that point to positions on a time axis of a clip file. Expressed another way, the playlist file identifies playitems and sub-playitems, each playitem or sub-playitem points to a clip file or portion thereof and identifies the clip information file associated with the clip file. The clip information file is used, among other things, to map the playitems to the clip file of source packets. Playlists may also include playlist marks which point to specific places (e.g., a specific address) in a clip file The general information files (not shown) provide general information for managing the reproduction of the A/V streams recorded on the optical disk.

Figure 2:
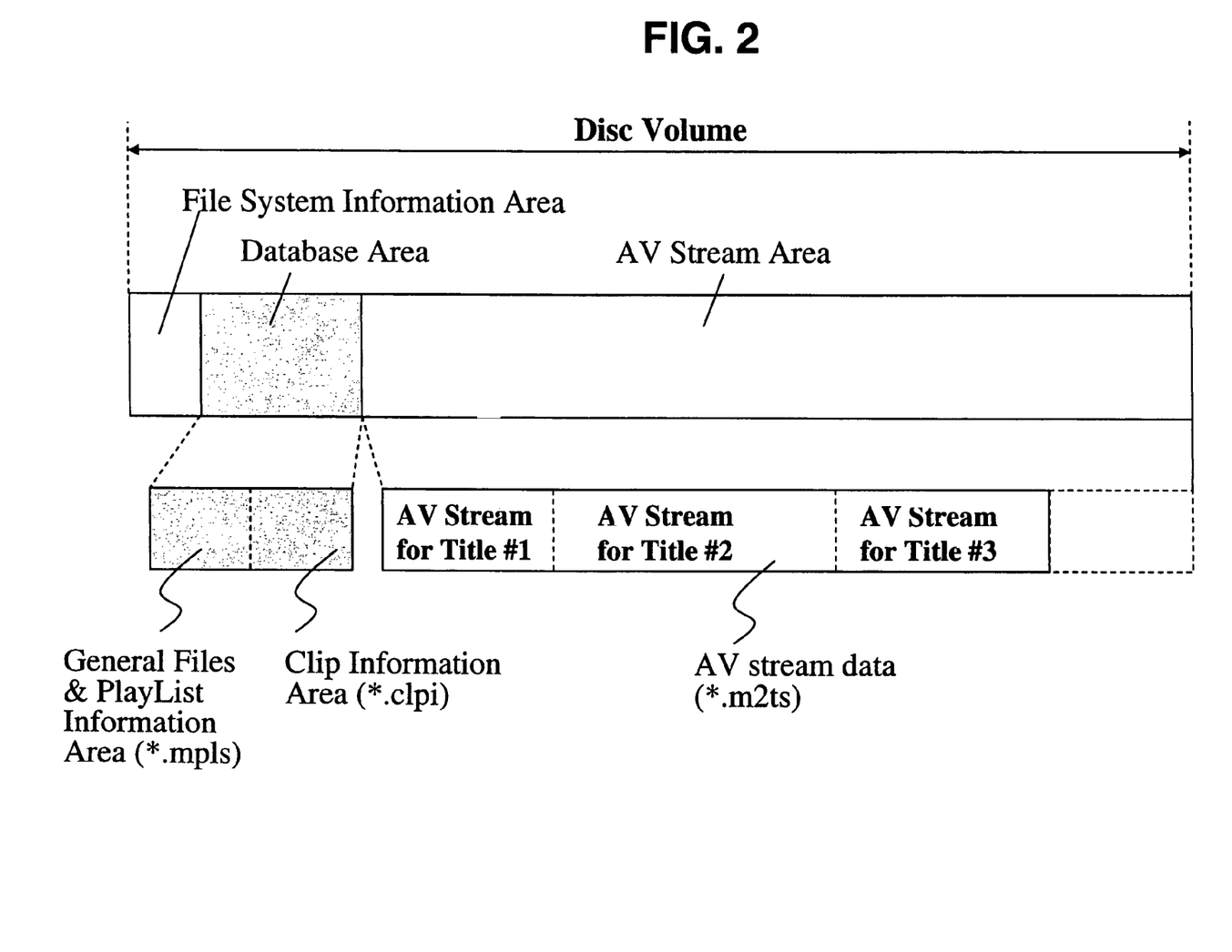
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM, still images or pictures may be recorded and reproduced in an organized and/or user interactive fashion, for example, as slideshows. The data structure for managing reproduction of still pictures for a high-density recording medium in accordance with embodiments of the present invention will be described along with methods and apparatuses according to embodiments of the present invention for recording and reproducing still images.

As will be appreciated from the above and following disclosure, still images may be displayed as a sequential slideshow, a random/shuffle slideshow, or a browsable slideshow. A sequential slideshow involves the reproduction of still images having limited duration in the order set forth by the playlist. This reproduction of the still images may also occur in synchronized reproduction with audio data. A browsable slide show involves reproduction of still images having infinite duration in an order set forth by, for example, the playlist. Reproduction proceeds to a previous or subsequent still image based on user input. A random/shuffle slideshow is a form of sequential or browsable slideshow in which the order to reproduce the still images is randomized.

Figure 3:
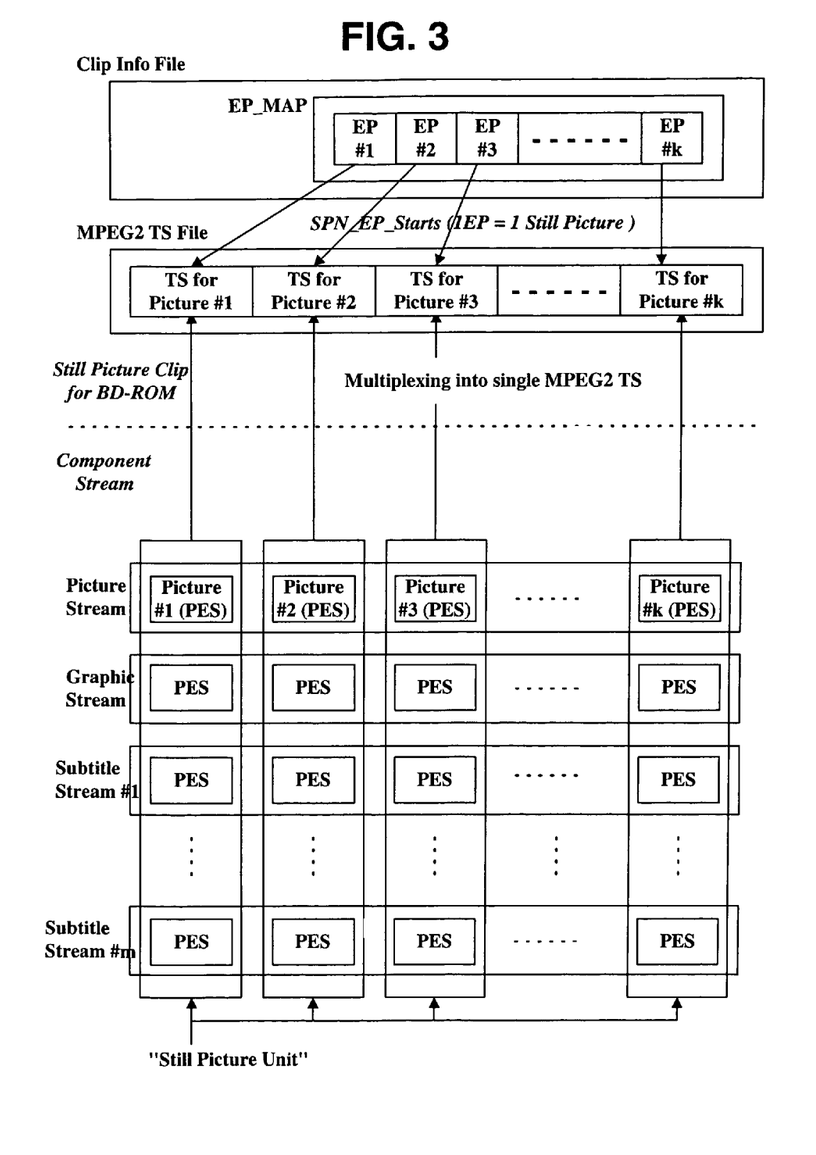
FIGS. 3 and 4 illustrate a detailed embodiment of portions of the data structure in FIG. 1 and a method for managing still images of a high-density recording medium according to the present invention.
Figure 4:
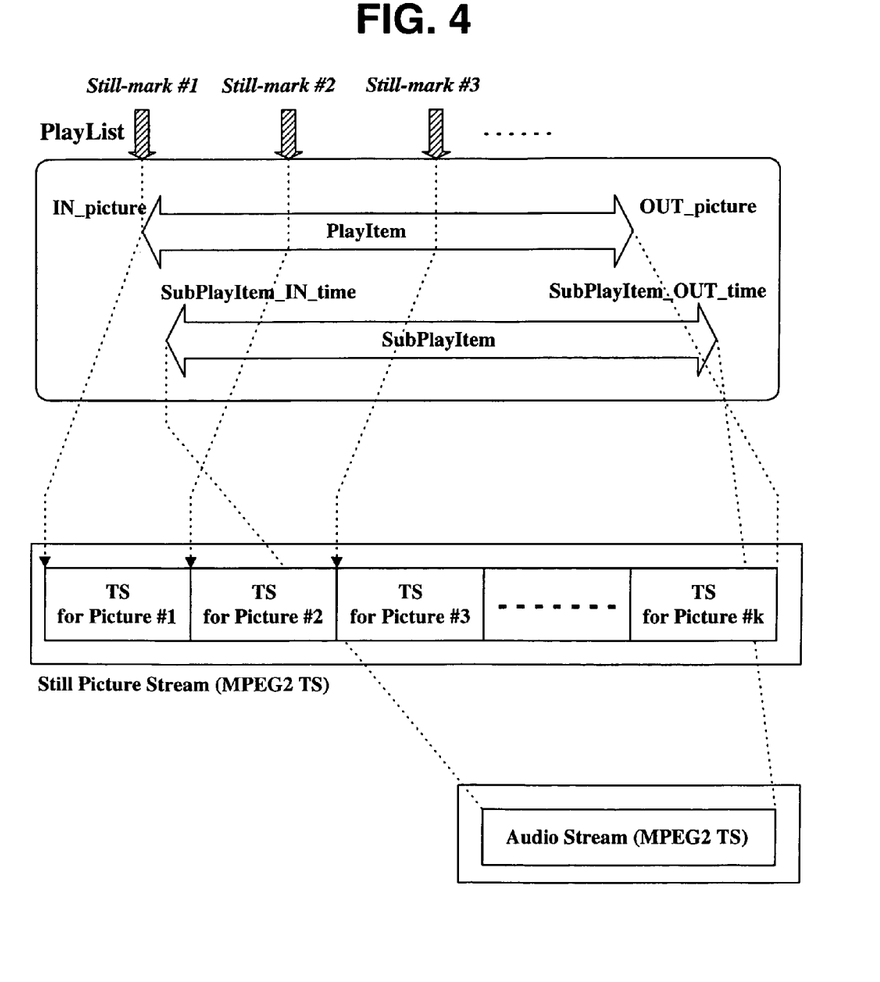

FIGS. 3 and 4 illustrate an embodiment of a data structure and method for managing still images of a high-density recording medium such as a BD-ROM. As shown in FIG. 3, the component data streams of the still picture stream and the related data streams (e.g., the graphic & subtitle streams) are packetized into PES packets on a still image basis. Namely, each PES packet of the still picture stream includes a single still picture, and the associated PES packets of the related data include the related data associated with the still picture (e.g., for reproduction in synchronization with the associated still picture). The still picture together with related data to be reproduced in synchronization therewith are grouped into a still picture unit. On a still picture unit basis, the still picture stream and related data streams are multiplexed into a still picture file of MPEG2 transport streams.

FIG. 3 further shows a clip information file corresponding to the still picture file. The clip information file includes an entry point map (EP_MAP). Individual entry points (EP #1~#k) in the EP map contain respective navigation information for accessing a head recording position of a corresponding still picture unit. The navigation information, for example, includes source packet number entry point start (SPN_EP_Start) information indicating the start recording position of the corresponding still picture unit.

FIG. 4 illustrates a playlist for play control of the still picture file discussed above with respect to FIG. 3. As shown, a playitem (PlayItem) in the playlist contains in-picture (IN_picture) information and out-picture (OUT_picture) information corresponding respectively to the start position and end position of the still images in the still picture file to reproduce. A sub-playitem (SubPlayItem) in the playlist contains sub-playitem in-time (SubPlayItem_IN_time) information and sub-playitem out-time (SubPlayItem_OUT_time) information for a separate audio file to be reproduced in association with the still picture file. The audio data may be reproduced in either a synchronized or unsynchronized fashion with the associated still images.

The playlist further includes a playlist mark, referred to hereinafter as still mark, pointing to each still picture. The presentation duration information for the still picture and related data included in a still picture unit may be recorded in the still mark corresponding to the still picture unit. Alternatively or additionally, the presentation duration information may be contained in the playitem.

The still marks are particularly useful when skipping between pictures during a browsable slideshow. It will further be appreciated that the still picture file or portions thereof can be simultaneously associated with a number of playlists with presentation durations different from each other.

Presentation time stamps (PTSS) are recorded in each PES packet and/or each entry point. A PTS has a value in proportion to, for example, the well-known program clock reference (PCR) value; and therefore, as described below, will have a value proportional to a time base defined by PCRs referred to as STC (e.g., a system time based on of PCRs). As is well-known, the PCR is a time stamp added to packets in an MPEG2 transport stream according to the MPEG2 standard. When a still picture has an infinite presentation duration, the STC (e.g., PCR count) maintains the same value and a PTS proportional thereto is recorded in the PES packet of the corresponding still picture. Accordingly, an identical PTS is recorded to both the PES packet of a still picture with infinite presentation duration and the PES packet of the preceding still picture. For example, a reproducing apparatus may calculate the difference between the PTSs recorded in subsequent entry points or subsequent still picture PESs to determine presentation duration for the second of the two consecutive still pictures. When the difference between the PTSs is zero, the reproducing apparatus reproduces the corresponding still picture with infinite presentation duration —meaning that the still picture is reproduced until user input providing instructions to the contrary is received. Otherwise, the reproducing apparatus reproduces the still picture for the calculated duration.

In other words, the reproducing apparatus, at the time of, for example, reproducing slideshows of still pictures, decides whether the presentation duration for each still picture is infinite or finite. When the presentation duration corresponds to infinite, the reproducing apparatus does not increase the STC but maintains the previous value. On the contrary, when the presentation duration is finite, the reproducing apparatus conducts a series of operations to normally increase the STC.

Figure 5:
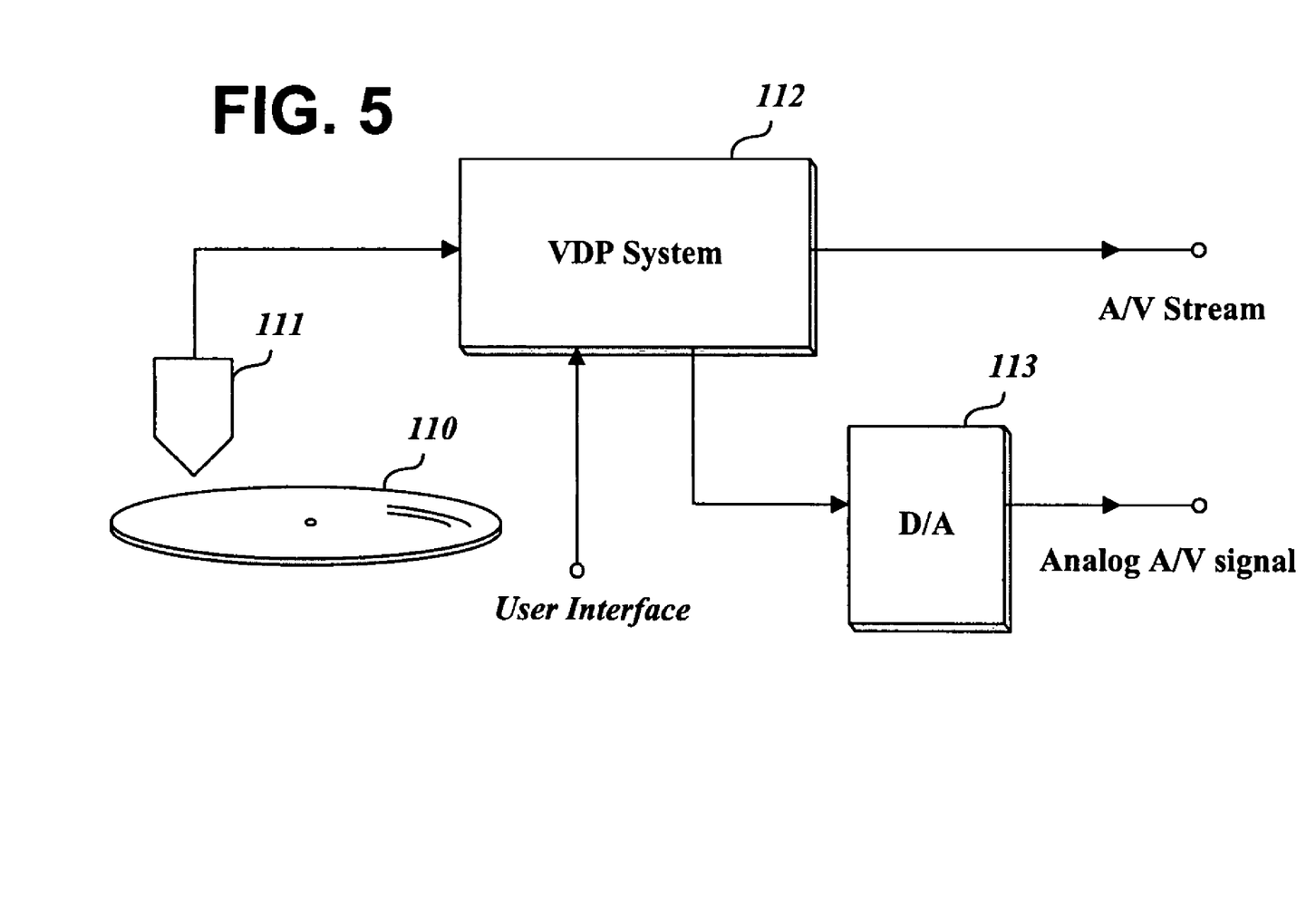
FIG. 5 illustrates a schematic diagram of a partial structure of an optical disc reproducing apparatus according to an embodiment of the present invention.

FIG. 5 illustrates a schematic diagram of a partial structure of an optical disc reproducing apparatus according to an embodiment of the present invention. As shown, the optical disc reproducing apparatus includes an optical pickup 111 for reproducing data from the an optical disk. A VDP (Video Disc Play) system 112 controls the reproduction operation of the optical pickup 111 and demodulates the data reproduced by the optical pickup 111. The VDP 112 produces an AV stream, which may also be fed to a D/A converter 113 to generate an analog version of the AV stream.

The VDP system 112 controls the optical pickup 111 and demodulates the reproduced data based on user input received from a user interface and the navigation and management information recorded on the optical disk in accordance with the present invention. For example, the VDP system 112 makes reference to still marks included in a playlist and an entry point map included in a clip information file as described above to reproduce a still picture file. Namely, the VDP system 112 reads out a still picture, graphic data, and subtitle data of each still picture unit according to the order of entry points (EP #1, #2, . . . ) recorded in the entry point map. Then, the VDP system 112 conducts a series of operations for reproducing still pictures, which may be (i) reproduced for a fixed time duration according to the presentation duration information included in the still marks or determined form the PTSs, or (ii) reproduced in the form of skipped reproduction in units of the still picture unit, for example, corresponding to each of the still marks, according to the key input of the user.

Figure 6:
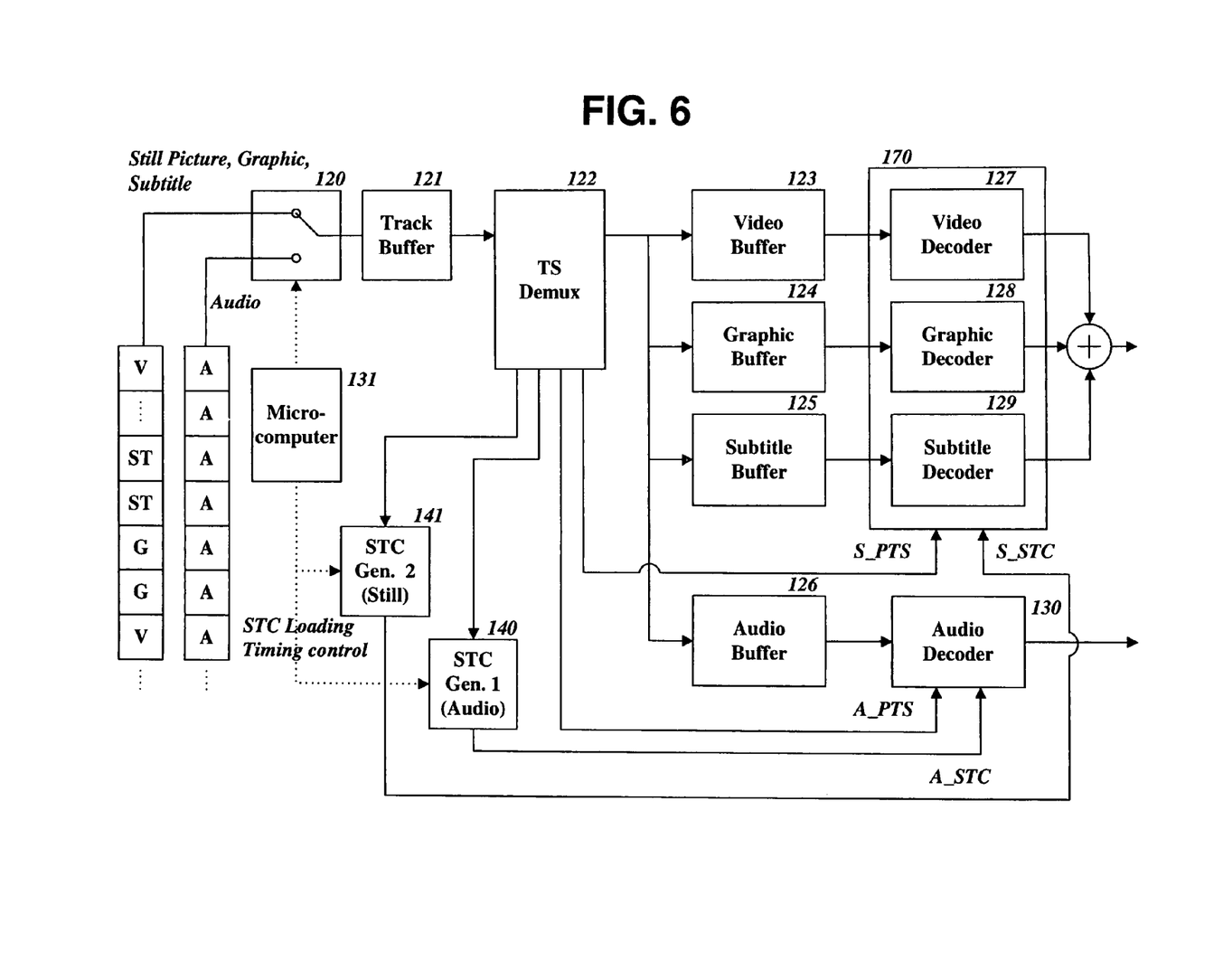
FIG. 6 illustrates a detailed structure of a first embodiment of an optical disc apparatus according to the present invention.

As shown in FIG. 6, the VDP system 112 may comprise a switch 120, a track buffer 121, a TS demultiplexer 122, a video buffer 123, a graphic buffer 124, a subtitle buffer 125, an audio buffer 126, a video decoder 127, a graphic decoder 128, a subtitle decoder 129, an audio decoder 130, a microcomputer 131, a first STC generator 140 and a second STC generator 141.

The microcomputer 131 controls the operation of the switch 120 according to the key input of a user or presentation duration information, thereby selectively feeding a still picture (V), graphic data (G), and subtitle data (ST) into the track buffer 121. The TS demultiplexer 122 makes reference to the packet ID (PID) of the data stream temporarily stored in the track buffer 121 and distributes still picture data, graphic data, and subtitle data into the video buffer 123, the graphic buffer 124, and the subtitle buffer 125, respectively.

The video decoder 127 decodes the still picture data, the graphic decoder 128 decodes the graphic data, and the subtitle decoder 129 decodes the subtitle data. As a result, a single still picture and related graphic and subtitle data are reproduced, for example, in synchronization.

Similarly, the microcomputer 131 controls the operation of the switch 120 and selectively feeds audio data (A) read out from an optical disc into the track buffer 121. The TS demultiplexer 122 makes reference to the packet ID (PID) of the audio data stream temporarily stored in the track buffer 121, thereby separating the audio data into the audio buffer 126.

The TS demultiplexer 122 separates each audio presentation time stamp (A_PTS) from the reproduced audio data stream and sends the A_PTSs to the audio decoder 130. The TS demultiplexer 122 also separates audio program clock references (A_PCRs) from the reproduced audio data stream and sends the A_PCRs to the first STC generator 140, which counts the A_PCR to generate an audio STC. Then, the audio STC (A_STC) is sent to the audio decoder 130. The audio decoder 130 compares the A_PTS with the A_STC and outputs decoded audio when they are of the same value.

In a similar manner, the TS demultiplexer 122 separates each still picture presentation time stamp (S_PTS) from the reproduced still picture data stream and sends the S_PTSs to an MPEG decoder 170 formed by the video decoder 127, the graphic decoder 128, and the subtitle decoder 129. The TS demultiplexer 122 also separates still picture data program clock references (S_PCRs) from the reproduced still picture data stream and sends the S_PCRs to the second STC generator 141, which counts the S_PCRs to generate an still picture STC. Then, the still STC (S_STC) is sent to the MPEG decoder 170.

The MPEG decoder 170 keeps comparing the S_PTS with the S_STC and outputs a still image when they are of the same value. If the presentation duration of the still image is limitless, the microcomputer 131 controls the second STC generator 141 to stop its counting operation.

If another still picture is to be displayed according to user key input, the microcomputer 131 loads the PCR obtained from the still picture to be displayed into the second STC generator 141 and resumes the PCR counting operation.

As a result, the optical disk reproducing apparatus may reproduce still images recorded on the optical disk using the MPEG decoder 170 for reproducing movie data by utilizing the first and second STC generators 140 and 141 and perform browsable slideshow operations for the still images responsive to user key input. With respect to the browsable slideshows, for example, the audio data and still picture data (or still and related picture data) may be reproduced independently because of the separate and independent STC control provided by the first and second STC generators 140 and 141. Namely, if a user changes the still picture being displayed as described above, this does not affect the decoding of the audio data.

Figure 7:
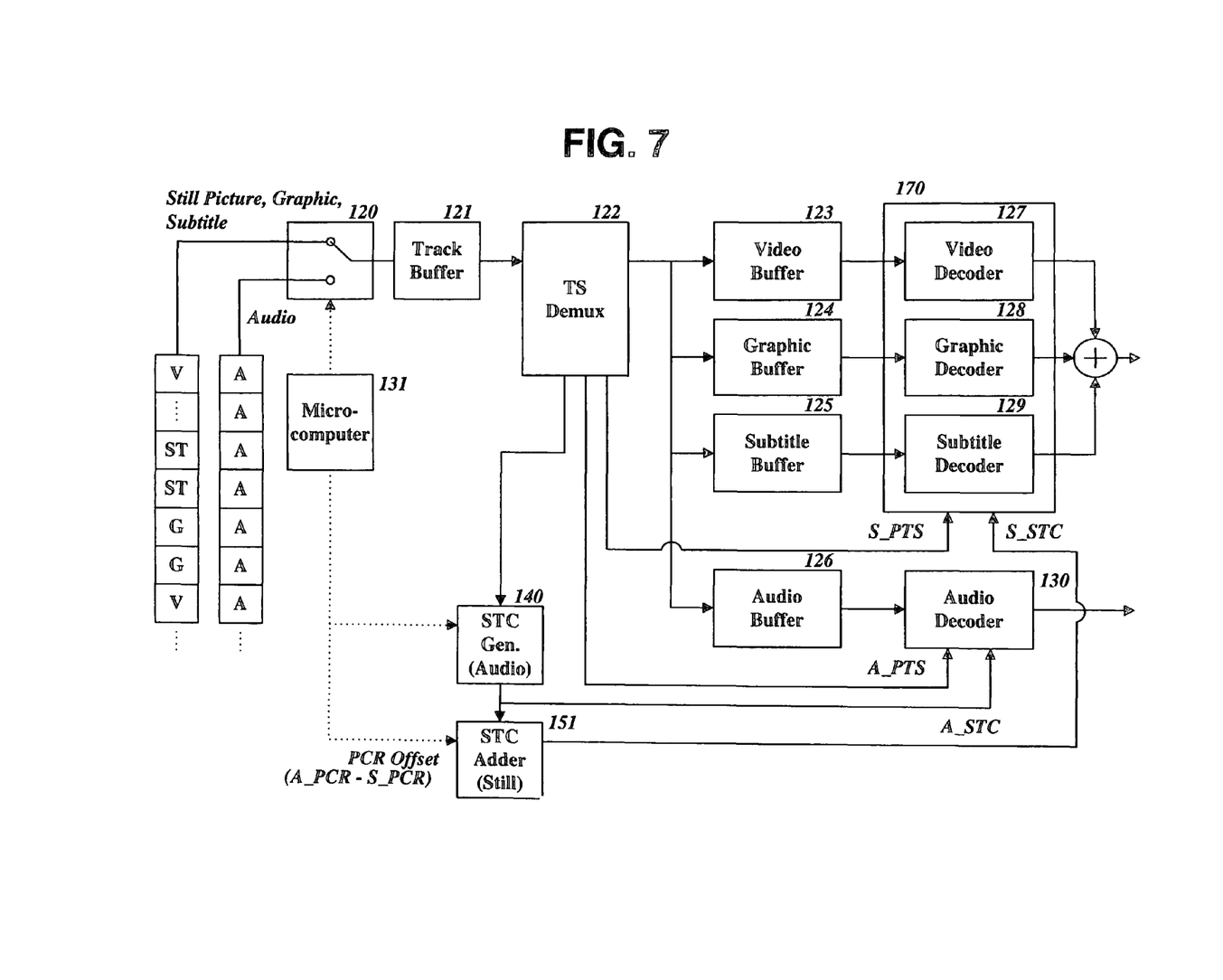
FIG. 7 is a detailed structure of a second embodiment of an optical disc apparatus according to the present invention.

In the VDP system 112, a STC adder 151 may be employed instead of the second STC generator 141 such as shown in FIG. 7. When presenting a still picture having a limitless presentation duration, the microcomputer 131 controls the STC adder 151 in such a way that the S_STC generated thereby is not applied to the MPEG decoder 170.

If a different still picture is to be displayed, the microcomputer 131 calculates the difference between a PCR obtained from the still picture to be displayed and the A_STC reproduced by the first STC generator 140, and outputs the difference to the STC adder 151 as a PCR offset.

The STC adder 151 adds the A_STC from the STC generator 140 and the PCR offset from the microcomputer 131, and outputs the sum as the S_STC to the MPEG decoder 170. As a result, the optical disk reproducing apparatus may reproduce still images recorded on the optical disk using the MPEG decoder 170 for reproducing movie data by utilizing the S_STC and output from the STC adder 151 and may perform browsable slideshow operations for the still images responsive to user key input.

Figure 8:
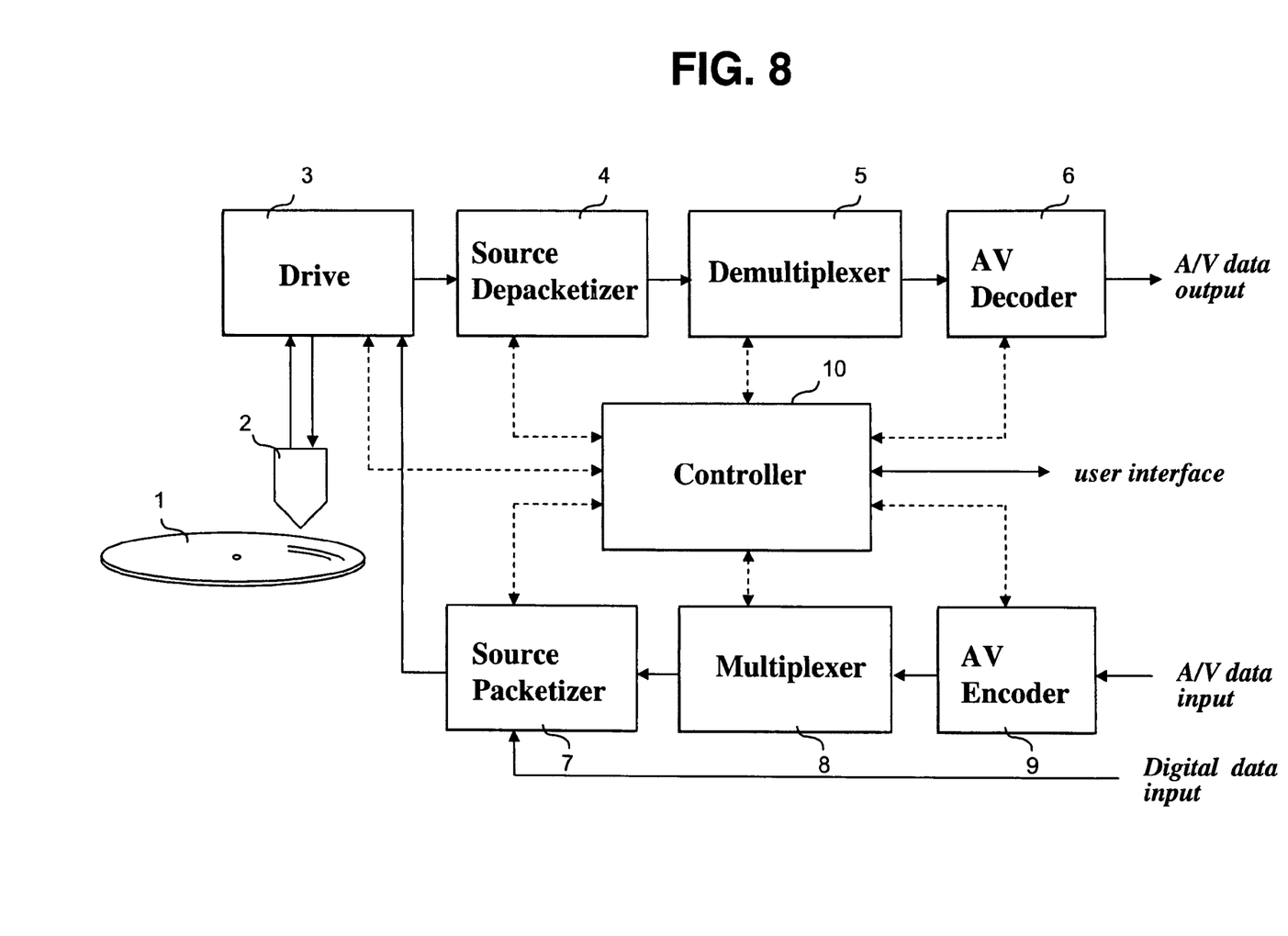
FIG. 8 illustrates another embodiment of a recording and reproducing apparatus according to the present invention.

FIG. 8 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 8, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-4 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced in association with audio data based on the navigation information. Furthermore, an image or group of images may be reproduced as a slideshow or portion of a slideshow. As also discussed, a slideshow may be synchronized, browsable, etc.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 8 has been described as a recording and reproducing apparatus, it will be understood that only a recording or only a reproducing apparatus may be provided using those portions of FIG. 8 providing the recording or reproducing function.

As will be appreciated from the forgoing disclosure, the present invention provides a recording medium having a data structure for managing still images and audio data recorded on a high-density recording medium (e.g., a high-density optical disk such as a BD-ROM). For example, the data structure allows for displaying still images and audio data in various ways.

The method of managing still images for a high-density recording medium in accordance with the invention provides various still control operations and allows effective linked reproduction of still images along with associated subtitle data or graphic images.

As apparent from the above description, the present invention provides methods and apparatuses for recording a data structure on a high density recording medium for managing still images and audio data recorded on the recording medium.

The above description further provides methods and apparatuses for reproducing still image and audio data recorded on a high density recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A method of reproducing still picture data and audio data from a recording medium, comprising:
   decoding, by a reproducing apparatus, the still picture data in a first stream file and the audio data in a second stream file based on respective, independent system times (STCs), the first stream file not including audio data, the still picture data being reproduced as a slideshow, the audio data being reproduced with the still picture data;
   outputting the decoded still picture data based on the respective still picture STC and presentation time stamps (PTSs) in the still picture data; and outputting the decoded audio data based on the respective audio STC and PTSs in the audio data;
wherein the outputting of the decoded audio data is not synchronized with the outputting of the decoded still picture data when the decoded audio data is output with the decoded still picture data, the audio data being reproduced without interrupting the reproducing of the still picture data as the slideshow, and
wherein the PTSs are associated with entry points of the respective decoded still picture data and audio data.

2. The method of claim 1, further comprising:
generating a first STC for the still picture data by a first STC generator; and
generating a second STC for the audio data by a second STC generator.

3. The method of claim 2, wherein
the generating the first STC step generates the first STC from program clock references (PCRs) in the still picture data; and
the generating the second STC step generates the second STC from PCRs in the audio data.

4. The method of claim 1, further comprising:
reproducing the first stream file of the still picture data and the second stream file of the audio data;
demultiplexing the first stream file into the still picture data and the second stream file into the audio data to obtain first program clock references (PCRs) from the still picture data and second PCRs from the audio data;
generating first and second STCs from the first and second PCRs, respectively; and wherein the decoding step includes,
    decoding the demultiplexed still picture data based on the first STC, and
    decoding the demultiplexed audio data based on the second STC.

5. The method of claim 4, wherein
the demultiplexing step further obtains the PTSs in the still picture data and the PTSs in the audio data.

6. The method of claim 1, further comprising:
reproducing at least one playlist file from the non-transitory recording medium, the at least one playlist file including at least one playitem and at least one sub-playitem, the at least one playitem indicating an in-point and out-point of the first stream file for reproducing the still picture data, the at least one sub-playitem indicating an in-point and out-point of the second stream file for reproducing the audio data, the playlist file including information indicating whether or not the audio data associated with the sub-playitem is usable for the still picture data.

7. A method of reproducing still picture data and audio data from a recording medium, comprising:
generating, by a reproducing apparatus. a first STC for the still picture data;
generating, by the reproducing apparatus. a second STC for the audio data;
decoding, by the reproducing apparatus, the still picture data based on the first STC, the first stream file not including audio data, the still picture data being reproduced as a slideshow, the audio data being reproduced with the still picture data;
decoding, by the reproducing apparatus, the audio data based on the second STC;
outputting the decoded still picture data based on the first STC and presentation time stamps (PTSs) in the still picture data; and outputting the decoded audio data based on the second STC and the PTSs in the audio data,
wherein the outputting of the decoded audio data is not synchronized with the outputting of the decoded still picture data when the decoded audio data is output with the decoded still picture data, the audio data being reproduced without interrupting the reproducing of the still picture data as the slideshow, and
wherein the PTSs are associated with entry points of the respective decoded still picture data and audio data.

8. The method of claim 7, wherein,
the generating of the first STC by the reproducing apparatus includes generating the first STC by a first STC generator,
the generating of the second STC by the reproducing apparatus includes generating the second STC by a second STC generator.

9. The method of claim 7, further comprising:
reproducing at least one playlist file from the non-transitory recording medium,
the at least one playlist file including at least one playitem and at least one sub-playitem,
the at least one playitem indicating an in-point and an out-point of the first stream file for reproducing the still picture data,
the at least one sub-playitem indicating an in-point and an out-point of the second stream file for reproducing the audio data,
the playlist file including information indicating whether or not the audio data associated with the sub-playitem is usable for the still picture data.

10. An apparatus for reproducing still picture data and audio data from a recording medium, comprising:
a decoding unit configured to decode the still picture data in a first stream file based on a first system time (STC), the decoding unit configured to output the decoded still picture data based on the first STC and presentation time stamps (PTSs) in the still picture data, the first stream file not including audio data, the still picture data being reproduced as a slideshow, the audio data being reproduced with the still picture data, the decoding unit configured to decode the audio data in a second stream file based on a second STC, independent of the first STC, and the decoding unit configured to output the decoded audio data based on the second STC and the PTSs in the audio data,
wherein the output of the decoded audio data is not synchronized with the output of the decoded still picture data when the decoded audio data is output with the decoded still picture data, the audio data being reproduced without interrupting the reproducing of the still picture data as the slideshow, and
wherein the PTSs are associated with entry points of the respective decoded still picture data and audio data.

11. The apparatus of claim 10, wherein the decoding unit is configured to decode the audio data and output the decoded audio data such that the decoded audio data is not synchronized with the outputting of the decoded still picture data.

12. The apparatus of claim 10, further comprising:
a first STC generator configured to generate a first STC for the still picture data; and
a second STC generator configured to generate a second STC for the audio data.

13. The apparatus of claim 12, wherein the first STC generator is configured to generate the first STC from program clock references (PCRs) in the still picture data; and the second STC generator is configured to generate the second STC from PCRs in the audio data.

14. The apparatus of claim 10, wherein the decoding unit includes,
a first decoder and a second decoder,
wherein,
the first decoder is configured to decode the still picture data in the first stream file based on the first system time (STC), and to output the decoded still picture data based on the first STC and presentation time stamps (PTSs) in the still picture data, and
the second decoder is configured to decode the audio data in the second stream file based on the second STC, independent of the first STC, independent of the first STC, and to output the decoded audio data based on the second STC and PTSs in the audio data.

15. The apparatus of claim 14, wherein,
the demultiplexer is configured to obtain the PTSs in the still picture data and the PTSs in the audio data, and configured to obtain first program clock references (PCRs) from the still picture data and second PCRs from the audio data.

16. The apparatus of claim 10, further comprising:
a pick up configured to reproduce data on the recording medium;
a controller configured to control the pick up to reproduce at least one playlist file from the recording medium, the at least one playlist file including at least one playitem and at least one sub-playitem, the at least one playitem indicating an in-point and out-point of the first stream file for reproducing the still picture data, the at least one sub-playitem indicating an in-point and out-point of the second stream file for reproducing the audio data, the playlist file including information indicating whether or not the audio data associated with the sub-playitem is usable for the still picture data.

* * * * *